United States Patent [19]

Hall

[11] 4,429,090

[45] Jan. 31, 1984

[54] CATALYST CONTAINING OLIGOMERIC OXOLANYL ALKANE MODIFIERS AND PROCESS FOR THE PRODUCTION OF POLYMERS HAVING INCREASED 1,2-MICROSTRUCTURE

[75] Inventor: James E. Hall, Akron, Ohio

[73] Assignee: The Firestone Tire & Rubber Company, Akron, Ohio

[21] Appl. No.: 473,472

[22] Filed: Mar. 9, 1983

[51] Int. Cl.³ .............................................. C08F 4/48
[52] U.S. Cl. ................................. 526/177; 526/181; 502/152; 502/157
[58] Field of Search ..................... 526/177, 181, 335; 252/431 R

[56] References Cited

U.S. PATENT DOCUMENTS 3,726,832  4/1973  Komatsu .............................. 526/181

Primary Examiner—Paul R. Michl
Attorney, Agent, or Firm—Frank J. Troy, Sr.

[57] ABSTRACT

A process and catalyst system is disclosed herein for the preparation of (co)polymers having a 1,2-microstructure of between 20 and 95 percent. These (co)polymers are prepared in a hydrocarbon or other non-polar solvent from a monomer system which contains at least one 1,3-diene monomer. The catalyst system which is employed in the production of the (co)polymers of the present invention is a combination of (1) an anionic initiator based on lithium; (2) an alkyl magnesium compound or an alkyl aluminum compound or a mixture thereof; and (3) a modifier compound selected from the group consisting of linear and cyclic oligomeric oxolanyl alkanes.

11 Claims, No Drawings

CATALYST CONTAINING OLIGOMERIC OXOLANYL ALKANE MODIFIERS AND PROCESS FOR THE PRODUCTION OF POLYMERS HAVING INCREASED 1,2-MICROSTRUCTURE

DESCRIPTION

Background Of The Invention

The polymerization of 1,3-dienes to rubbery polymers, such as polybutadiene, using a butyl lithium catalyst in a hydrocarbon diluent normally yields a polymer containing 90% 1,4-microstructure and 10% 1,2-microstructure. Diene polymers and copolymers having increased 1,2-microstructure content have become of interest for use in applications such as for tire rubbers, molded rubber goods, molding compounds, surface coatings and the like.

It has now been discovered that increased percentages of 1,2-microstructure can be obtained by carrying out the polymerization in the presence of a modifier compound of a linear or cyclic oligomeric oxolanyl alkane.

In a copending application to the same assignee filed the same day as this application entitled "Oligomeric Oxolanyl Alkanes As Modifiers For Polymerization Of Dienes Using Lithium-Based Initiators," by James E. Hall, there is disclosed a catalyst system employing oligomeric oxolanyl alkane modifiers in combination with an anionic initiator based on lithium for increasing 1,2-microstructure in polymers prepared from 1,3-dienes which reduces the rate of side reactions which occur during polymerization, thus adding stability to the polymerization reaction. The instant invention modifies the catalyst system of the copending application in order to increase the conversion of monomer to polymer, to produce a (co)polymer having an increased 1,2-microstructure in the 1,3-diene monomer contributed units and to decrease the use of lithium based initiators.

SUMMARY OF THE INVENTION

A process and catalyst system is disclosed herein for the preparation of (co)polymers containing a 1,2-microstructure of between about twenty (20) and about ninety-five (95) percent. These (co)polymers are prepared in an inert non-polar solvent such as a hydrocarbon solvent from a monomer system which contains at least one 1,3-diene monomer. The catalyst system which is employed in the production of the (co)polymer is a combination of (1) an anionic initiator based on lithium; (2) an alkyl magnesium compound or an alkyl aluminum compound or a mixture thereof; and (3) a modifier compound of either a linear or cyclic oligomeric oxolanyl alkane.

DETAILED DESCRIPTION OF THE INVENTION

The process of the present invention for the preparation of polybutadiene or other (co) polymers formed from at least one 1,3-diene monomer employs a novel catalyst system which produces a polymer which has a 1,2-microstructure ranging between about twenty (20) and ninety-five (95) percent in the 1,3-diene monomer contributed units.

The polymerization catalyst which is used in the present invention is a combination of (1) an anionic initiator based on lithium; (2) an alkyl magnesium compound or an alkyl aluminum compound or a mixture thereof; and (3) a modifier compound of either a linear or cyclic oligomeric oxolanyl alkane.

MONOMER SYSTEM

The catalyst system of the present invention is used in preparing (co)polymers having an increased vinyl content in the 1,3-diene monomers contributed units. Polymerizable 1,3-dienes employed in the production of the polymers of the present invention are 1,3-conjugated dienes containing from four to twelve, inclusive, carbon atoms per molecule. Examples thereof include the following: 1,3-butadiene; isoprene; 2,3-diemthyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkylbutadienes, it is preferred that the alkyl groups contain from one to three carbon atoms. Numerous others are disclosed for instance in U.S. Pat. No. 3,377,404, the disclosure with respect to which is incorporated herein by reference. The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. Comonomers of different 1,3-diene monomers can be combined in any proportion. The term (co)polymer is defined herein as either a homopolymer or a copolymer formed from at least one diene monomer and optionally one or more copolymerizable monomer.

In addition to the above described conjugated dienes, one or more suitable copolymerizable monomers such as vinyl-substituted aromatic monomers can be incorporated into the polymerization mixture. Examples of suitable copolymerizable monomers for use in the preparation of copolymers in the present invention include: styrene; alpha-methylstyrene; 1-vinylnaphthalene; 2-vinyl-naphthalene; 1-alpha-methylvinylnaphthalene; 2-alpha-methylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenyl-benzene; 1,4-divinylbenzene; 1,3-distyrylbenzene; 1,4-distyrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constitutes generally not greater than 12. Examples of these latter compounds include: 4-methylstyrene; vinyl toluene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyltoluene. Again reference is made to U.S. Pat. No. 3,377,404 for disclosures of additional vinyl-substituted aromatic compounds which are incorporated herein by reference.

When a comonomer system employs one or more copolymerizable monomers other than a 1,3-diene monomer, generally at least one percent preferably at least five percent by weight of the copolymerizable monomers should be used and as much as eighty-five percent, preferably no more than forty percent may be used.

The solution polymerization takes place in inert organic diluents, in which the monomer, anionic initiator based on lithium, alkyl magnesium and/or alkyl aluminum compounds, and the modifier compound are soluble. The anionic lithium based initiator may not be soluble in these solvents in some instances. Many suitable inert diluents are known in the art and those diluents generally preferred are alkanes, or other non-polar solvents. Suitable diluents include but are not limited to ethane, propane, iso- and n-butane, iso- and n-pentane, iso- and n-hexane, iso- and n-heptane, iso- and n-octane, cyclobutane, cyclopentane, cyclohexane, cycloheptane, cyclooctane; benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction.

The concentration of monomer in solvent ranges from 2 to 50 wt. percent or more and is generally dependent upon economics and the ability to control reaction conditions and to handle the polymer solution. The use of monomer concentrations ranging from between 15 to 25 wt. percent is generally practical.

CATALYST SYSTEM

The catalyst system employed in the present invention is a combination of (1) an anionic initiator based on lithium; (2) an alkyl magnesium compound or an alkyl aluminum compound or a mixture thereof; and (3) a modifier compound of either a linear or cyclic oligomeric oxolanyl alkane.

The anionic initiators based on lithium which can be selected from any known organolithium compounds which are known in the art as being useful in the polymerization of 1,3-diene monomers. Suitable catalysts which initiate polymerization of the monomer system include organolithium catalysts which have the formula $R(Li)_{x''}$ wherein R represents a hydrocarbyl radical of 1 to 20, preferably 2-8, carbon atoms per R group, and $x''$ is an integer of 1-4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentylmethyl, cyclohexyl-ethyl, cyclopentyl-ethyl, methylcyclopentyl-ethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include:
phenyllithium, naphthyllithium, 4-butylphenyllithium, p-tolyllithium, 4-phenylbutyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_{x''}$. The preferred lithium catalysts for use in the present invention is n-butyllithium.

Other lithium catalysts which can be employed in combination with the hydrocarbyllithium catalysts are lithium dialkyl amines, lithium dialkyl phosphines, lithium alkyl aryl phosphines, lithium diaryl phosphines and lithium catalysts having the formula $RO(Li)_{x''}$ wherein R is defined above.

The dialkyl magnesium compounds which are useful as catalysts in the present invention contain alkyl groups substituted on the magnesium which contain from one to ten carbon atoms. Suitable dialkyl magnesium catalysts include dimethyl magnesium, diethyl magnesium, dipropyl magnesium, di(n,s,t-)butyl magnesium, and the like. The preferred dialkyl magnesium catalysts for use in the present invention is (n-butyl, s-butyl)magnesium or di-n-butyl magnesium.

The trialkyl aluminum compounds which are useful as catalysts in the present invention contain from one to eight carbon atoms in each alkyl group. Examples of suitable trialkyl aluminum catalysts include trimethyl aluminum, triethyl aluminum, tri(iso- or n-)propyl aluminum, tri(n,s,t)-isobutyl aluminum, and the like. The preferred trialkyl aluminum catalyst for use in the present invention is triethyl aluminum or triisobutyl aluminum.

The oligomeric oxolanyl alkane modifier compounds which are used in the present invention in combination with the anionic initiator, and dialkyl magnesium and/or trialkyl aluminum compounds, are represented by the structural formulas I and II:

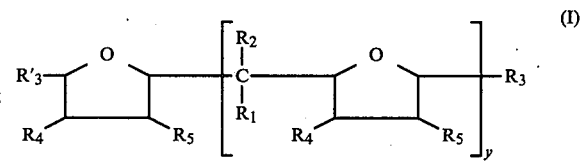

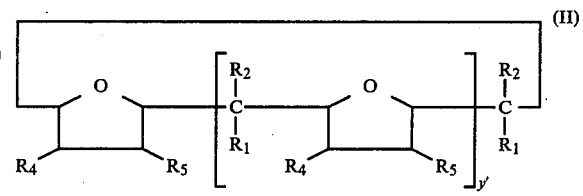

wherein $R_1$ and $R_2$ independently are hydrogen or an alkyl group and the total number of carbon atoms in $-CR_1R_2-$ is between one and nine inclusive; y is an integer of 1 to 5 inclusive, y' is an integer of 3 to 5 inclusive, $R_3'$, $R_3$, $R_4$ and $R_5$ independently are $-H$ or $-C_nH_{2n+1}$ wherein $n = 1$ to 6.

While the modifiers of structural formula I are linear oligomers and the modifiers represented by structural formula II are cyclic oligomers, hereinafter the term oxolanyl modifiers is contemplated to encompass the modifiers of both structural formulas.

The oxolanyl modifiers are prepared by methods known to those skilled in the art. Typically the modifiers are prepared by reacting furan which is unsubstituted in either the 2- or 5-position and either an aldehyde such as acetaldehyde or a ketone, such as acetone, in the presence of an acid. Careful control of the reaction parameters allows for the production of a product containing up to 95 percent of dimers, trimers, and tetramers. Once the oligomers or cyclic structures are formed, these reaction products are hydrogenated in the presence of suitable hydrogenation catalysts such as nickel based catalysts. Any suitable hydrogenation process known in the art may be employed to produce the modifier compounds of structural formulas I or II.

While unsubstituted furans are the preferred reactant, 2-alkyl-furans containing up to six carbon atoms in the alkyl group can be employed in the production of the oxolanyl oligomers of structural formula I. When 2-alkyl-furans are employed in the production of modifiers, oxolanyl dimers are the main reaction product. The 2-alkyl-furan also may end cap any oligomers formed if furan is used as a coreactant.

The cyclic oxolanyl oligomer modifier precursors are formed only by the reaction of a furan compound which is unsubstituted in the 2,5-position with either one or more aldehydes or one or more ketones or a mixture thereof.

Suitable oligomeric oxolanyl modifiers for use in the catalyst system include but are not limited to: 2,2-bis(2-oxolanyl) propane; 1,1-bis(2-oxolanyl) ethane; 2,2-bis(2-oxolanyl) butane; 2,2-bis(5-methyl-2-oxolanyl) propane; 2,2-bis(3,4,5-trimethyl-2-oxolanyl) propane. These oxolanyl modifier compounds represent a few of the dimer compounds represented by structural formula I and other linear and cyclic oligomeric modifiers are apparent from their structural formulas.

The preferred oxolanyl modifier for use in the present invention is 2,2-bis(2-oxolanyl) propane. Mixtures of oxolanyl modifiers can also be employed.

While the addition of $R_2Mg$ and/or $R_3Al$ requires the use of less anionic initiator based on lithium, this addition also under certain conditions permits the usage of a smaller amount of oxolanyl modifier in order to obtain equivalent 1,2-microstructure in the resultant polymer than would be employed without the use of $R_2Mg$ and/or $R_3Al$.

The catalyst mixture of the present invention is employed in amounts designed to result in the desired molecular weight. For example, a polybutadiene of 100,000 $\overline{M}_n$ would be prepared by charging enough active anionic initiator based on lithium, dialkyl magnesium, and/or trialkyl aluminum to react with impurities plus typically 1.0 milliequivalent total of lithium anionic initiator plus dialkyl magnesium and/or trialkyl aluminum catalyst per one-hundred grams of 1,3-butadiene. Polymers of from 1,000 $\overline{M}_n$ to 500,000 $\overline{M}_n$ can be readily made by one skilled in this technology.

The millimole ratio of the catalyst mixture to the weight of the monomers which is employed in the preparation of the co(polymers) of the present invention is based upon the number of equivalents of active alkyl radicals of the anionic initiator based on lithium, dialkyl magnesium and/or trialkyl aluminum compounds per hundred grams of 1,3-diene monomer.

The millimole ratio of the total amount of lithium magnesium and aluminum catalyst compounds to the weight of the monomers which are employed in the preparation of the (co)polymers of the present invention range from about 0.2 millimoles to about 100 millimoles, preferably 0.3 millimoles to 3.0 millimoles, per one-hundred grams of monomer, dependent upon the number average molecular weight ($\overline{M}_n$) desired for the polymer. This monomer weight is the weight of the 1,3-diene monomer employed when homopolymers are produced and is the total weight of the comonomers, that is, the 1,3-diene monomers and the copolymerizable monomers when copolymers are produced.

The molar ratio of the oxolanyl modifiers to the total amount anionic initiator based on lithium, dialkyl magnesium and/or trialkyl aluminum compound can vary from 1.0/20.0 to 20.0/1.0, preferably from 1.0/1.0 to 5.0/1.0.

As previously indicated either a dialkyl magnesium compound or a trialkyl aluminum compound or a combination of both compounds can be employed in the catalyst system of the present invention. For the most effective results, the (magnesium+aluminum)/lithium metal mole ratio, hereinafter referred to as (Mg+Al)/Li ratio, is generally in the range of 0.01/1 to 100/1, preferably in the range of the dialkyl magnesium compound and the trialkyl aluminum compound is generally in the range of 0.1-100 millimoles (mM) per hundred grams (phgm) of monomer, preferably 0.33-1 mM phgm.

When both a dialkyl magnesium ($R_2Mg$) and trialkyl aluminum ($R_3Al$) compound are employed in the catalyst system, the mole ratio of $R_2Mg:R_3Al$ ranges from 0.01:1.0 to 1.0:0.01, preferably from 0.4:1.0 to 1.0:0.4. However, when ratios of these alkyl metal compounds are not within these ratios, it can be possibly considered that one component is an incidental impurity and thus the catalyst combination of these compositions are considered to be within the scope of the present invention.

Whether the trialkyl aluminum compound is used alone or with a dialkyl magnesium compound, the Li/Al ratio may need to be greater than 1.0 so that the polymerization rates are not too slow to be impractical.

The anionic initiator, based on lithium, dialkyl magnesium compound and/or the trialkyl aluminum compound and the oxolanyl modifier can be added as a mixture to the monomer system, or they may be added sequentially or simultaneously to the monomer system.

The amount of oxolanyl modifier, the amount of $R_2Mg$ and/or $R_3Al$, as well as the amount of anionic initiator can be varied to control the 1,2-microstructure in the 1,3-diene (co)polymer produced by the present invention. It has been determined that the 1,3-diene (co)polymers produced according to the process of this invention can be preferably controlled to have a vinyl content ranging between about twenty (20) to about ninety-five (95) percent 1,2-microstructure in the 1,3-diene monomer contributed units.

All amounts of oxolanyl modifiers, amounts of $R_2Mg$ and/or $R_3Al$, as well as amount of anionic initiator which are disclosed herein as applicable to the present invention are considered to be catalytically effective amounts, that is, effective amounts for initiating and conducting polymerization of the disclosed monomer systems to produce a (co)polymer containing a 1,2-microstructure ranging between about 20 and 95 percent in the 1,3-diene monomer contributed units.

Process conditions such as the starting temperature of the polymerization reaction and the absolute modifier concentration independently affect the final 1,2-microstructure content of the 1,3-diene (co)polymers. These conditions can be controlled for each monomer reaction system to produce the final desired 1,2-microstructure content of from about twenty (20) to about ninety-five (95) percent. It is desirable to produce polymers and copolymers having a 1,2-microstructure between 30 and 60 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in this connection, the term adiabatic polymerization means that heat is neither supplied or removed during the course of polymerization.

The present polymerization system is applicable to solution polymerization techniques which are conducted at temperatures of 0° C. to 160° C., preferably 90° to 160° C. Reaction temperature below 90° C. temperature range normally produce (co)polymers containing a very high 1,2-microstructure, for example, between 60 and 95 percent of a 1,2-microstructure. Reaction temperatures between 90° C. and 160° C. generally produce (co)polymers containing between 20 and 60 percent of a 1,2-microstructure. Any temperature in this range of 0° C. to 160° C. which gives a convenient polymerization rate while producing a (co)polymer having a 1,2-microstructure ranging between 20 and 95 percent is acceptable. If the operation is to be conducted as a batch operation, initiation temperatures below about 90° C. are preferred. If the operation is to be a continuous operation slightly higher initiation temperatures are employed, such as 100° C. to 120° C., and it is preferred that the polymerization process be maintained in a range of from 90° C. to 160° C., most preferably 115° C. to 140° C.

The polymerization reaction can be performed at pressures between 0.5 to 100 atmospheres. When the desired degree of polymerization has been reached, the (co)polymer can be isolated by precipitation with a non-solvent such as methanol, isopropanol or water. Alternatively, the solution can be injected into the slurry tank containing a hot non-solvent whereupon the solvent is flashed off and the (co)polymer remains as a slurry with the non-solvent. Alternatively, the solvent can be removed directly by the application of heat and/or flashing to a lower pressure.

Although butadiene homopolymers or homopolymers prepared from other 1,3-diene monomers are preferred in the practice of this invention, copolymers containing at least one 1,3-diene monomer can be prepared where the comonomers impart desirable properties and do not detract from the polymer properties. The mean average molecular weight of the final (co)polymer produced can range from 1,000 to 500,000. These (co)polymers depending on their molecular weight and composition can be used for a variety of applications ranging from molding materials, rubber goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention.

In the following examples, the preparation of the oxolanyl modifiers was as follows: 1.5 moles of furan and 1.0 mole of acetone was reacted in the presence of 0.15 moles HCl (37% aqueous solution) at 20°–50° C. for 24 hours. The product, polydimethylfurfuryl oligomers containing 2–6 furyl units, is separated from an aqueous layer, neutralized with a base and purified by vacuum distillation. The oligomers are hydrogenated in the presence of a nickel catalyst system to oxolanyl alkane oligomers which are purified, dried and ready for use as oxolanyl modifiers.

EXAMPLE 1

A one gallon stainless steel reactor equipped with a stirrer blade is charged with 245 gm of 1,3-butadiene in 2030 gm of n-hexane. Thereinafter 2.85 milliequivalents of THF functional groups utilizing oligomeric oxolanyl propanes (hereinafter OOPS) was added and the temperature was adjusted to 100° C. To this mixture was added 1.5 millimoles of n-butyllithium and 1.0 millimole of (n-Bu, s-Bu)Mg. The contents of the reactor was stirred and polymerization was completed in 0.5 hours with the maximum temperature reaching 128° C. After termination of the reaction, 0.5 percent by weight of an antioxidant, di-tert-butyl-p-cresol ("IONOL"), based on the weight of the butadiene, was added to the mixture which was coagulated in isopropanol and dried to remove the solids. The product polybutadiene represented a 98 percent conversion of monomer to polymer containing 23.5 percent of a 1,2-microstructure as determined by IR spectroscopy. The $\overline{M}_n$ of the polymer was 86,800 and $\overline{M}_w/\overline{M}_n = 1.41$.

EXAMPLES 2–21

The following examples were conducted in accordance with the procedures of Example 1 or in 28 oz. crown capped bottles. The reaction conditions and the polymer properties for Examples 2–21 are illustrated in Tables 1 and 2. The weight percent of 1,3-butadiene monomer utilized in each example is displayed in weight percent per total weight of the solution. Also in parentheses beside the weight percent is the weight in grams of butadiene utilized. In tables 1 and 2, $T_i$ represents the temperature at initiation of polymerization and $T_f$ represents the final polymerization temperature. Also $\overline{M}_n$ represents the number average molecular weight of the polymer and $\overline{M}_w$ represents the weight average molecular weight of the polymer.

Examples 2 through 11 utilized n-butyllithium, OOPS and (n-, sec-)butylmagnesium in the catalyst system and polymerization was conducted for 0.5 hours.

Examples 12 through 19 utilized n-butyllithium, OOPS, (n-, sec-)dibutylmagnesium, and triethylaluminum in the catalyst system and polymerization was conducted for 0.5 hours.

Examples 20 and 21 utilized n-butyllithium, OOPS and triisobutyl aluminum in the catalyst system and polymerization was conducted for 4 hours.

TABLE 1

| Example No. | Wt. Percent[1] 1,3-Butadiene (Grams) | Anionic[2] Initiator (Millimoles) | OOPS[3] (Milliequi- valents of THF) | $R_2Mg$[4] (Milli- moles) | Time Hours | $T_i$ °C. | $T_f$ °C. | Percent Conversion to Polymer | % 1,2[5] | $\overline{M}_n$ | $\overline{M}_w/\overline{M}_n$ |
|---|---|---|---|---|---|---|---|---|---|---|---|
| 2 | 10.3 (245) | 1.5 | 2.95 | 1.0 | 0.5 | 99 | 135 | 100 | 34.7 | 90,100 | 1.38 |
| 3 | 10.65 (250) | 1.0 | 5.0 | 1.0 | 0.5 | 99 | 113 | 96 | 35.5 | 105,000 | 1.45 |
| 4 | 10.3 (245) | 1.5 | 14.7 | 1.0 | 0.5 | 99 | 121 | 99 | 47.8 | 100,400 | 1.32 |
| 5 | 11.94 (284) | 1.0 | 10.0 | 1.0 | 0.5 | 103 | 135 | 96 | 39.2 | 128,300 | 1.35 |
| 6 | 15.0 (50) | 0.3 | 0.3 | 0.2 | 24 | 50 | — | — | 67.6 | — | — |
| 7 | 15.0 (50) | 0.3 | 0.6 | 0.2 | 24 | 50 | — | — | 72.6 | — | — |
| 8 | 15.0 (50) | 0.3 | 1.5 | 0.2 | 24 | 50 | — | — | 79.5 | — | — |
| 9 | 15.0 (50) | 0.3 | 3.0 | 0.2 | 24 | 50 | — | — | 80.1 | — | — |
| 10 | 15.0 (50) | 0.3 | 0.3 | 0.2 | 24 | 5 | — | — | 87.0 | — | — |
| 11 | 15.0 (50) | 0.3 | 3.0 | 0.2 | 24 | 5 | — | — | 89.6 | — | — |

[1] In n-hexane
[2] n-Butyllithium
[3] Oligomeric oxolanyl propanes
[4] (n-, sec-)Dibutylmagnesium
[5] Percent of 1,2-microstructure

TABLE 2

| Example No. | Wt. Percent[1] 1,3-Butadiene (Grams) | Anionic[2] Initiator (Millimoles) | OOPS[3] (Milliequi- valents of THF) | $R_2Mg$[4] (Milli- moles) | $R_3Al$ (Milli- moles) | $T_i$ °C. | $T_f$ °C. | Percent Conversion to Polymer | % 1,2[6] | $\overline{M}_n$ | $\overline{M}_w/\overline{M}_n$ |
|---|---|---|---|---|---|---|---|---|---|---|---|
| 12 | 15 (47) | 0.3 | 0.15 | 0.075 | 0.125 (5) | — | — | 95 | 8.6 | 176,200 | 1.68 |
| 13 | 15 (47) | 0.3 | 0.27 | 0.075 | 0.125 (5) | 50 | — | 93 | 30.1 | 158,400 | 1.79 |
| 14 | 15 (47) | 0.3 | 0.6 | 0.075 | 0.125 (5) | 50 | — | 96 | 66.2 | 197,400 | 1.48 |
| 15 | 15 (49) | 0.3 | 1.5 | 0.075 | 0.125 (5) | 50 | — | 97 | 77.0 | 191,000 | 1.62 |
| 16 | 15 (48) | 0.3 | 3.0 | 0.075 | 0.125 (5) | 50 | — | 96 | 77.6 | 210,800 | 1.57 |
| 17 | 10.65 (250) | 1.5 | 2.85 | 0.375 | 0.625 (5) | 100 | 136 | 98 | 19.9 | 131,300 | 1.62 |
| 18 | 10.65 (250) | 1.5 | 7.65 | 0.375 | 0.625 (5) | 99 | 128 | 98 | 33.2 | 195,400 | 1.43 |
| 19 | 10.65 (250) | 1.5 | 10.15 | 0.375 | 0.625 (5) | 99 | 115 | 94 | 48.6 | 198,100 | 1.69 |
| 20 | 15 (45) | 0.15 | 1.0 (8) | — | 0.10 (7) | 30 | — | 93 | 78.1 | — | — |
| 21 | 15 (45) | 0.15 | 1.0 (8) | — | 0.10 (7) | 70 | — | 88 | 72.3 | — | — |

[1] In n-hexane
[2] n-Butyllithium
[3] Oligomeric oxolanyl propanes
[4] (n-, sec-)Dibutylmagnesium
[5] Triethylaluminum
[6] Percent of 1,2-microstructure
[7] Triisobutyl aluminum
[8] 2,2-bis(2-oxolanyl)propane From the foregoing description, one skilled in the art can easily ascertain the essential characteristics of this invention, and without departing from the spirit and scope thereof, can make various changes and modifications of the invention to adapt it to various usages and conditions.

I claim:

1. A catalyst system comprising:
   (a) at least one anionic initiator based on lithium,
   (b) at least one compound selected from the group consisting of a dialkyl magnesium compound and a trialkyl aluminum compound, and
   (c) at least one oxolanyl compound selected from the group consisting of:

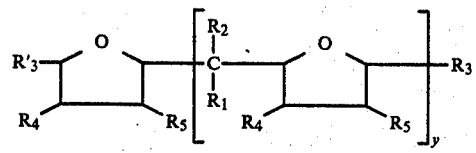

(i)

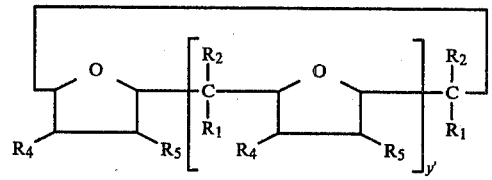

(ii)

wherein $R_1$ and $R_2$ independently are hydrogen or an alkyl group and the total number of carbon atoms in —$CR_1R_2$— ranges between one and nine inclusive; y is an integer of 1 to 5 inclusive, y' is an integer of 3 to 5 inclusive, $R_3'$, $R_3$, $R_4$ and $R_5$ independently are —H or —$C_nH_{2n+1}$ wherein n=1 to 6.

2. The catalyst system of claim 1 wherein the oxolanyl compound (b) is 2,2-bis(2-oxolanyl) propane.

3. The catalyst system of claim 1 wherein the anionic initiator is n-butyllithium.

4. The catalyst system of claim 1 wherein the mole ratio of (a) to (b) ranges between 1/0.01 and 1/100 and the mole ratio of [(a)+(b)] to (c) ranges from 20.0/1.0 to 1.0/20.0.

5. A process for the preparation of a polymer by polymerizing:
   (A) 15 to 100 percent of at least one 1,3-diene monomer, and (B) 0 to 85 percent of one or more reactive monomers which are copolymerizable with said 1,3-diene monomers, in an inert non-polar solvent in the presence of a catalytically effective amount of catalyst system comprising:
(a) at least one anionic initiator based on lithium,
(b) at least one compound selected from the group consisting of a dialkyl magnesium compound and a trialkyl aluminum compound, and
(c) at least one oxolanyl modifier compound selected from the group consisting of:

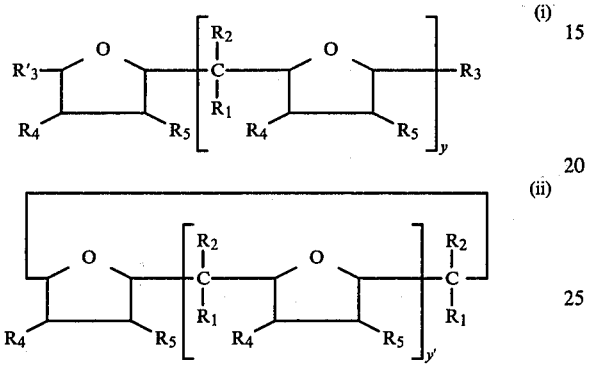

wherein $R_1$ and $R_2$ independently are hydrogen or an alkyl group and the total number of carbon atoms in $-CR_1R_2-$ ranges between one and nine inclusive; y is an integer of 1 to 5 inclusive, y' is an integer of 3 to 5 inclusive, $R'_3$, $R_3$, $R_4$ and $R_5$ independently are $-H$ or $-C_nH_{2n+1}$ wherein n=1 to 6;

in which the mole ratio of (a) to (b) ranges between 1/0.01 and 1/100 and the molar ratio of [(a)+(b)] to (c) ranges between 20.0/1.0 and 1.0/20.0, the millimoles of the [(a)+(b)] per 100 grams of the (A+B) monomers ranges between about 0.2 and about 100, the polymerization temperature is maintained between about 0° C. and 160° C., wherein said polymer contains a 1,2-microstructure in the 1,3-diene monomer contributed units ranging between 20 and 95 percent.

6. The process as in claim 5 wherein the 1,3-diene is a butadiene.

7. The process as in claim 5 wherein the 1,3-diene is butadiene and the reactive monomer is styrene.

8. The process as in claim 5 wherein the anionic initiator (a) is n-butyllithium.

9. The process as in claim 5 wherein the oxolanyl modifier is 2,2-bis(2-oxolanyl) propane.

10. The process as in claim 5 wherein the polymer has a 1,2-microstructure in the 1,3-diene monomer contributed units ranging between 30 and 60 percent.

11. The process as in claim 5 wherein the polymerization temperature is maintained between 115° C. and 140° C.

* * * * *

UNITED STATES PATENT AND TRADEMARK OFFICE
CERTIFICATE OF CORRECTION

PATENT NO. : 4,429,090
DATED : JANUARY 31, 1984
INVENTOR(S) : JAMES E. HALL

It is certified that error appears in the above—identified patent and that said Letters Patent are hereby corrected as shown below:

Column 9, Example 12, Table 2. The dash (-) appearing as the first entry under the column heading $T_i °C$ should read "50".

Signed and Sealed this

Fifteenth Day of May 1984

[SEAL]

Attest:

Attesting Officer

GERALD J. MOSSINGHOFF

Commissioner of Patents and Trademarks